United States Patent
Takizawa

(10) Patent No.: US 8,507,582 B2
(45) Date of Patent: Aug. 13, 2013

(54) TIRE TREAD-USE RUBBER COMPOSITION

(75) Inventor: Yoichi Takizawa, Hiratsuka (JP)

(73) Assignee: The Yokohama Rubber Co. Ltd. (JP)

( * ) Notice: Subject to any disclaimer, the term of this patent is extended or adjusted under 35 U.S.C. 154(b) by 451 days.

(21) Appl. No.: 12/816,097

(22) Filed: Jun. 15, 2010

(65) Prior Publication Data

US 2010/0324168 A1 Dec. 23, 2010

(30) Foreign Application Priority Data

Jun. 17, 2009 (JP) ................................. 2009-144737

(51) Int. Cl.
*C09D 11/00* (2006.01)
(52) U.S. Cl.
USPC ....................................................... 523/150
(58) Field of Classification Search
USPC ....................................................... 523/160
See application file for complete search history.

(56) References Cited

U.S. PATENT DOCUMENTS

| | | | | |
|---|---|---|---|---|
| 4,677,165 A | * | 6/1987 | Kikuchi et al. | 525/332.9 |
| 4,861,842 A | * | 8/1989 | Cohen et al. | 525/329.3 |
| 5,430,086 A | * | 7/1995 | Saito et al. | 524/495 |
| 5,594,052 A | * | 1/1997 | D'Sidocky et al. | 524/83 |
| 5,614,580 A | * | 3/1997 | Zanzig et al. | 524/492 |
| 6,845,797 B2 | * | 1/2005 | Lin et al. | 152/525 |
| 2006/0258794 A1 | * | 11/2006 | Gaudet | 524/496 |
| 2007/0037908 A1 | * | 2/2007 | Pille-Wolf | 524/270 |
| 2009/0105398 A1 | * | 4/2009 | Hirabayashi | 524/506 |

FOREIGN PATENT DOCUMENTS

| JP | 10-204216 | | 8/1998 |
|---|---|---|---|
| JP | 2008-174688 | * | 7/2008 |

OTHER PUBLICATIONS

Machine translation of JP 2008-174688.*

* cited by examiner

*Primary Examiner* — Doris Lee
(74) *Attorney, Agent, or Firm* — Thorpe North & Western LLP

(57) ABSTRACT

A tire tread-use rubber composition includes from 10 to 50 parts by weight of a tackifying resin having a softening point of from 100° C. to 150° C.; from 70 to 130 parts by weight of a carbon black having a nitrogen specific surface area of from 250 to 400 m$^2$/g; from 1 to 3 parts by weight of sulfur; from 0.5 to 4.0 parts by weight of a sulfenamide vulcanization accelerator; and from 1.5 to 5.0 parts by weight of a thiuram vulcanization accelerator per 100 parts by weight of a rubber component; wherein when A is a compounded amount in parts by weight of the sulfenamide vulcanization accelerator, T is a compounded amount in parts by weight of the thiuram vulcanization accelerator, and S is a compounded amount in parts by weight of the sulfur, a weight ratio (A+T)/S is from 2 to 4.

18 Claims, No Drawings

TIRE TREAD-USE RUBBER COMPOSITION

PRIORITY CLAIM

This application is based upon and claims the benefit of priority from Japanese Patent Application No. 2009-144737, filed Jun. 17, 2009, the entire contents of which is incorporated herein by reference.

BACKGROUND

1. Technical Field

The present invention is related to a tire tread-use rubber composition and is particularly related to a tire tread-use rubber composition that has high grip performance from initial traveling, maintains that grip performance for a long duration, and improves wear resistance and blow-out resistance.

2. Related Art

In pneumatic tires for high-speed traveling, and especially in racing tires, superior grip performance from initial traveling is needed. Furthermore, long duration of that grip performance, high wear resistance, and high blow-out resistance are demanded.

A conventional method for improving the grip performance of pneumatic tires is to compound a large amount of a filler, such as small particle-sized carbon black, in a tire tread-use rubber composition. However, when large amounts of carbon black are compounded in tire tread-use rubber compositions, wear resistance and blow-out resistance decline. Additionally, when a pneumatic tire using such a tire tread-use rubber composition is subjected to high-speed traveling for long periods of time, there is a problem of grip performance gradually declining.

Japanese Unexamined Patent Application No. H10-204216 proposes a tire tread-use rubber composition compounded with a styrene butadiene rubber having a high glass transition temperature (Tg) and an α-pinene resin or dipentene aromatic vinyl polymer having a softening point of from 60° C. to 100° C. in order to obtain both grip performance and blow-out resistance. However, such tire tread-use rubber compositions do not sufficiently improve grip performance and blow-out resistance during the latter half of continued traveling. Additionally, such tire tread-use rubber compositions have a problem of blow-out resistance and grip performance during initial traveling being insufficient.

SUMMARY

An object of the present invention is to provide a tire tread-use rubber composition that has high grip performance from initial traveling, maintains that grip performance for a long duration, and improves wear resistance and blow-out resistance.

In order to achieve this object, the present invention provides a tire tread-use rubber composition including from 10 to 50 parts by weight of a tackifying resin having a softening point of from 100° C. to 150° C.; from 70 to 130 parts by weight of a carbon black having a nitrogen specific surface area of from 250 to 400 $m^2/g$; from 1 to 3 parts by weight of sulfur; from 0.5 to 4.0 parts by weight of a sulfenamide vulcanization accelerator; and from 1.5 to 5.0 parts by weight of a thiuram vulcanization accelerator per 100 parts by weight of a rubber component including from 10 to 30 weight % of a natural rubber and from 70 to 90 weight % of a styrene butadiene rubber having a glass transition temperature of from −35° C. to 0° C.; wherein when A is a compounded amount in parts by weight of the sulfenamide vulcanization accelerator, T is a compounded amount in parts by weight of the thiuram vulcanization accelerator, and S is a compounded amount in parts by weight of the sulfur, a weight ratio (A+T)/S is from 2 to 4.

When the tire tread-use rubber composition includes other fillers it is favorable that a sum of these other fillers and the carbon black is from 80 to 130 parts by weight per 100 parts by weight of the rubber component.

A pneumatic tire using this tire tread-use rubber composition is preferable for use as a racing tire.

The tire tread-use rubber composition of the present invention provides a tire tread-use rubber composition including from 10 to 50 parts by weight of a tackifying resin having a softening point of from 100° C. to 150° C.; from 70 to 130 parts by weight of a carbon black having a nitrogen specific surface area of from 250 to 400 $m^2/g$; from 1 to 3 parts by weight of sulfur; from 0.5 to 4.0 parts by weight of a sulfenamide vulcanization accelerator; and from 1.5 to 5.0 parts by weight of a thiuram vulcanization accelerator per 100 parts by weight of a rubber component including from 70 to 90 weight % of a styrene diene rubber having a glass transition temperature of from −35° C. to 0° C.; wherein when A is a compounded amount in parts by weight of the sulfenamide vulcanization accelerator, T is a compounded amount in parts by weight of the thiuram vulcanization accelerator, and S is a compounded amount in parts by weight of the sulfur, a weight ratio (A+T)/S is from 2 to 4. Therefore, grip performance during the latter half of continued traveling is superior and wear resistance and blow-out resistance can be improved. Additionally, grip performance during initial traveling can be improved because the rubber component includes from 10 to 30 weight % of the natural rubber and the glass transition temperature of the styrene butadiene rubber, the softening point of the tackifying resin, the nitrogen specific surface area of the carbon black, and the weight ratio (A+T)/S of the vulcanization accelerators and the sulfur are all within the abovementioned specified ranges.

DETAILED DESCRIPTION

A rubber component of the tire tread-use rubber composition of the present invention is formed from a natural rubber and a styrene butadiene rubber. Grip performance from initial traveling is improved by compounding the natural rubber. Additionally, wear resistance can also be improved. An amount of the natural rubber included in the rubber component is from 10 to 30 weight % and preferably from 15 to 25 weight %. If the amount of the natural rubber included is less than 10 weight %, grip performance during initial traveling will be insufficient. Moreover, if the amount of the natural rubber included is more than 30 weight %, grip performance during the latter half of continued traveling will be negatively affected.

Grip performance is improved by using the styrene butadiene rubber in the rubber component. Both grip performance during initial traveling and grip performance during the latter half of continued traveling can be provided by particularly compounding a styrene butadiene rubber having a glass transition temperature of from −35° C. to 0° C. and preferably from −25° C. to −10° C. If the glass transition temperature of the styrene butadiene rubber is lower than −35° C., grip performance during the latter half of continued high-speed traveling will be negatively affected. Moreover, if the glass transition temperature is higher than 0° C., a temperature dependency of the rubber will increase, causing grip performance during initial traveling to be insufficient. Additionally, wear resistance and blow-out resistance will decline. The glass transition temperature of the styrene butadiene rubber is measured by a thermograph via differential scanning calorimetry (DSC) under conditions of a temperature elevation speed of 20° C./minute. A temperature at a midpoint of the transition region is set as the glass transition temperature of the styrene butadiene rubber. Note that if the styrene butadiene rubber is an oil extended product, the glass transition temperature is a glass transition temperature of a styrene butadiene rubber in which oil extension oil has been removed via acetone extraction.

An amount of the styrene butadiene rubber included in the rubber component is from 70 to 90 weight % and preferably from 75 to 85 weight %. If the amount of the styrene butadiene rubber included is less than 70 weight %, grip performance during the latter half of continued traveling will be negatively affected. Moreover, if the amount of the styrene butadiene rubber included is more than 90 weight %, grip performance during initial traveling will be insufficient.

Grip performance during the latter half of continued traveling of the tire tread-use rubber composition of the present invention is improved by compounding a tackifying resin. The tackifying resin has a softening point of from 100° C. to 150° C., preferably from 110° C. to 140° C., and more preferably from 120° C. to 130° C. If the softening point of the tackifying resin is lower than 100° C., an effect of improving grip performance during the latter half of continued traveling will be insufficient. Moreover, if the softening point of the tackifying resin is higher than 150° C., wear resistance and grip performance during initial traveling will be negatively affected. The softening point of the tackifying resin is expressed as a value measured in accordance with Japanese Industrial Standard (JIS) K5902.

From 10 to 50 parts by weight and preferably from 20 to 40 parts by weight of the tackifying resin are compounded per 100 parts by weight of the rubber component. If the compounded amount of the tackifying resin is less than 10 parts by weight, maintainability of grip performance will decline. Moreover, if the compounded amount of the tackifying resin exceeds 50 parts per weight grip performance during initial traveling and wear resistance of the tire tread-use rubber composition will be negatively affected. Furthermore, during processing of the tire tread-use rubber composition, an adhesiveness of the tire tread-use rubber composition to a kneader or roll mill increases, which negatively affects processability. Note that the tackifying resin also functions as a softener and therefore compounded amounts of other softeners such as aroma oils and the like should be adjusted based on the compounded amount of the tackifying resin.

In the present invention "tackifying resin" refers to a resin that provides the tire tread-use rubber composition with tackiness. Generally, the tackifying resin is a thermoplastic resin having a molecular weight from several hundred to several thousand and provides tackiness to the tire tread-use rubber composition by being compounded with the natural rubber and the styrene butadiene rubber. Examples of the tackifying resin include natural resins such as terpene resins, rosin resins, and the like; and synthetic resins such as petroleum resins, carboniferous resins, phenol resins, xylene resin, and the like. Among these, terpene resins and rosin resins are preferable.

Examples of the terpene resins include α-pinene resin, β-pinene resin, limonene resin, hydrogenated limonene resin, dipentene resin, terpene phenol resin, terpene styrene resisn, aromatic modified terpene resin, hydrogenated terpene resin, and the like. Examples of the rosin resin include modified rosins such as gum rosin, tall oil rosin, wood rosin, hydrogenated rosin, disproportionate rosin, polymerized rosin, maleated rosin, fumarized rosin, and the like; ester derivatives of these rosins such as glycerine esters, pentaerythritol esters, methyl esters, triethylene glycol esters, and the like; and rosin-modified phenol resin and the like. Among these, terpene phenol resin, terpene styrene resin, aromatic modified terpene resin, and polymerized rosin are preferable from the perspectives of the wear resistance, blow-out resistance, and grip of the tire tread-use rubber composition.

In the present invention, rubber stiffness and exothermicity are increased and grip performance is improved by compounding a carbon black. A nitrogen specific surface area ($N_2SA$) of the carbon black is from 250 to 400 $m^2/g$, preferably from 280 to 370 $m^2/g$, and more preferably from 300 to 350 $m^2/g$. If the nitrogen specific surface area of the carbon black is less than 250 $m^2/g$, grip performance cannot be sufficiently obtained. Additionally, the rubber stiffness of the tire tread-use rubber composition will be insufficient. Moreover, if the nitrogen specific surface area exceeds 400 $m^2/g$, grip performance during initial traveling will decline and wear resistance and blow-out resistance will be negatively affected. Additionally, from a manufacturing perspective this is not preferable as processability will be negatively affected as a result of an increase in rubber viscosity. The nitrogen specific surface area of the carbon black is calculated according to JIS K6217-2.

From 70 to 130 parts by weight, preferably from 80 to 120 parts by weight, and more preferably from 90 to 110 parts by weight of the carbon black are compounded per 100 parts by weight of the rubber component. If the compounded amount of the carbon black is less than 70 parts by weight, the rubber stiffness and grip performance will be insufficient. Moreover, if the compounded amount of the carbon black exceeds 130 parts by weight, the rubber stiffness will become prone to weakening due to heat generation and maintainability of grip performance during continued traveling will decline. Additionally, shock resistance and blow-out resistance will decline.

The tire tread-use rubber composition of the present invention may include fillers other than the carbon black having the nitrogen specific surface area ($N_2SA$) of from 250 to 400 $m^2/g$ (hereafter referred to as "other fillers"). Examples of the other fillers include carbon blacks having a nitrogen specific surface area $N_2SA$ less than 250 $m^2/g$ or greater than 400 $m^2/g$, silica, clay, calcium carbonate, aluminum hydroxide, mica, talc, and the like. Among these, carbon blacks having a nitrogen specific surface area less than 250 $m^2/g$ or greater than 400 $m^2/g$ and silica are preferable. Particularly, grip performance during initial traveling and blow-out resistance is improved by using silica together with the carbon black having a nitrogen specific surface area of from 250 to 400 $m^2/g$. Additionally, grip performance during initial traveling, wear resistance, and blow-out resistance are improved by combined use of a carbon black having an $N_2SA$ less than 250 $m^2/g$. Grip performance during the latter half of continued traveling is improved by combined use of a carbon black having an $N_2SA$ greater than 400 $m^2/g$.

When compounding such other fillers, the compounded amount of the other fillers should be less than the compounded amount of the carbon black having an $N_2SA$ of from 250 to 400 $m^2/g$ and a total of the carbon black having an $N_2SA$ of from 250 to 400 $m^2/g$ and the other fillers is preferably from 80 to 130 parts by weight and more preferably from 90 to 120 parts by weight per 100 parts by weight of the rubber component. If the total compounded amount is less than 80 parts by weight, the rubber stiffness and grip performance will be insufficient. Moreover, if the total compounded amount exceeds 130 parts by weight, the rubber stiffness will become prone to weakening due to heat generation and maintainability of grip performance during continued traveling will decline. Additionally, wear resistance and blow-out resistance will decline.

The tire tread-use rubber composition of the present invention is compounded with from 1 to 3 parts by weight and preferably from 1.5 to 2.5 parts by weight of sulfur, from 0.5 to 4.0 parts by weight and preferably from 1.5 to 3.5 parts by weight of a sulfenamide vulcanization accelerator, and from 1.5 to 5.0 parts by weight and preferably from 2.0 to 4.5 parts by weight of a thiuram vulcanization accelerator per 100 parts by weight of the rubber component as vulcanization compounding agents. If the compounded amount of sulfur is less than 1 part by weight, the rubber stiffness will be insufficient and grip performance during the latter half of continued traveling will decline. Additionally, blow-out resistance will decline. Moreover, if the compounded amount of sulfur exceeds 3 parts by weight, grip performance during initial traveling and the latter half of continued traveling will decline. Any conventional sulfur that can be used in tire tread-use rubber compositions may be used as the sulfur for use in the present invention.

If the compounded amount of the sulfenamide vulcanization accelerator is less than 0.5 parts by weight, the rubber stiffness will decline. Additionally, blow-out resistance will decline. Moreover, if the compounded amount of the sulfenamide vulcanization accelerator exceeds 4 parts by weight, grip performance during initial traveling and the latter half of continued traveling will decline. If the compounded amount of the thiuram vulcanization accelerator is less than 1.5 parts by weight, the rubber stiffness will decline and grip performance during the latter half of continued traveling will decline. Additionally, blow-out resistance will decline. Moreover, if the compounded amount of the thiuram vulcanization accelerator exceeds 5 parts by weight, a vulcanization speed will increase, and a problem of rubber scorching during processing will occur. Additionally, grip performance during initial traveling and the latter half of continued traveling will decline.

In the present invention, when A is a compounded amount in parts by weight of the sulfenamide vulcanization accelerator, T is a compounded amount in parts by weight of the thiuram vulcanization accelerator, and S is a compounded amount in parts by weight of the sulfur per 100 parts by weight of the rubber component, a weight ratio (A+T)/S is from 2 to 4, preferably from 2.3 to 3.7, and more preferably from 2.5 to 3.5. If the weight ratio (A+T)/S of the vulcanizing compounding agents is less than 2, grip performance during the latter half of continued traveling will and blow-out resistance will be negatively affected. Moreover, if the weight ratio (A+T)/S exceeds 4, grip performance during initial traveling and wear resistance will be negatively affected.

Examples of the sulfenamide vulcanization accelerator for use in the present invention include N-cyclohexyl-benzothizole-2-sulfenamide, N-tert-butyl-benzothizole-2-sulfenamide, N-oxydiethylene-benzothizole-2-sulfenamide, N,N-dicyclohexyl-benzothizole-2-sulfenamide, and the like. Among these, N-cyclohexyl-2-benzothizole-2-sulfenamide and N-tert-butyl-2-benzothizole-2-sulfenamide are preferable.

Examples of the thiuram vulcanization accelerator include tetramethylthiuram monosulfide, tetramethylthiuram disulfide, tetrabutylthiuram disulfide, tetrabenzylthiuram disulfide, tetrakis(2-ethylhexyl)thiuram disulfide, dipentamethylenethiuram tetrasulfide, dipentamethylenethiuram hexasulfide, and the like. Among these, tetrakis(2-ethylhexyl) thiuram disulfide and tetrabenzylthiuram disulfide are preferable.

In addition to the aforementioned vulcanization accelerators the tire tread-use rubber composition of the present invention can also contain various types of additives that are commonly used in tire tread-use rubber compositions such as other vulcanization accelerators, vulcanization retarders, vulcanization acceleration aids, antiaging agents, plasticizers, and coupling agents. These additives may be blended according to any common method to form the tire tread-use rubber composition and may be used in vulcanization or cross-linking. Compounded amounts of these additives may be any conventional standard amount, so long as the objects of the present invention are not hindered. The tire tread-use rubber composition of the present invention can be produced by mixing the above-mentioned components using a well-known rubber kneading machine such as a Banbury mixer, a kneader, a roll mill, or the like.

The tire tread-use rubber composition of the present invention is preferable for use in tread portions of racing tires and general purpose high-performance tires. Pneumatic tires having tread portions constructed using the tire tread-use rubber composition of the present invention have superior grip performance from initial traveling, can maintain that grip performance for a long duration, and can display improved wear resistance and blow-out resistance.

The present invention is explained below using examples. However, the scope of the present invention is not limited to these examples.

EXAMPLES

Compounding ingredients other than sulfur and vulcanization accelerators were weighed according to each of the compositions for the 27 types of tire tread-use rubber compositions shown in Tables 1 to 3 (Examples 1 to 14 and Comparative examples 1 to 13). These compounding ingredients were kneaded in a 16 L Banbury Mixer for 10 minutes. Then, a master batch was discharged at a temperature of 160° C. and cooled at room temperature. The sulfur and the vulcanization accelerators were then added to the master batch in the 16 L Banbury mixer and mixed to produce the tire tread-use rubber compositions. The obtained 27 types of tire tread-use rubber compositions were then evaluated for blow-out resistance and wear resistance according to the following methods.

Blow-Out Resistance

Blow-out resistance was evaluated using a flexometer (Flexometer FT-1260, manufactured by Ueshima Seisakusho Co., Ltd.) in accordance with JIS K6265. Each of the obtained tire tread-use rubber compositions was vulcanized for 30 minutes at 150° C. to obtain a cylindrical test sample having a diameter of 17.8 mm and a height of 25.0 mm. These test samples were subjected to testing at a temperature of 100° C., under a static load of 680 N, a dynamic load of 600 N, and a frequency of 30 Hz. A time was measured until air bubbles could be observed (blow-out) on a cutting surface of each of the test samples. The obtained results are shown on the "Blow-out resistance" row of Tables 1 to 3 as index values with a blow-out test time of Comparative example 1 being 100. Larger index values indicate superior blow-out resistance.

Wear Resistance

Test samples, in accordance with JIS K6264, for each of the tire tread-use rubber compositions were vulcanized for 30 minutes at 160° C. Wear resistance (Pico abrasion) for each of the test samples was measured using a Pico Abrasion Tester (manufactured by Ferry Machine Co.) in accordance with JIS K6264. The obtained results are shown on the "Wear resistance" rows of Tables 1 to 3 as index values with an index value of Comparative example 1 being 100. Larger index values indicate superior wear resistance.

Size 195/55R15 pneumatic tires having tread portions constructed using the obtained 27 tire tread-use rubber compositions were manufactured. Each of the obtained pneumatic tires were constructed on size 15×6J rims, filled to an air pressure of 200 kPa and mounted on all four wheels of a four-wheel vehicle. A test driver then continually drove the vehicle around a dry circuit course (1 lap=2 km) ten laps, and lap times for each lap were recorded. Grip performance during initial traveling (dry grip performance during the first half of traveling) and maintainability of grip performance (dry grip performance during the latter half of traveling) were evaluated according to the following evaluation methods.

Grip Performance During Initial Traveling

Average times, taken from lap 1 to lap 3, when the vehicle was continually driven ten laps around the dry circuit course were evaluated according to the following evaluation criteria. An average time for a pneumatic tire of Comparative example 1 was used as a standard time. The obtained results are shown on the "Initial grip performance" rows of Tables 1 to 3. A higher rating indicates superior grip performance during initial traveling.

5: The average lap time is at least 0.5 seconds faster than the standard time.

4: The average lap time is from at least 0.2 seconds to less than 0.5 seconds faster than the standard time.

3: The average lap time is less than 0.2 seconds faster than the standard time.

2: The average lap time is from at least 0.2 seconds to less than 0.5 seconds slower than the standard time.

1: The average lap time is more than 0.5 seconds slower than the standard time.

Grip Performance During the Latter Half of Traveling

Average times, taken from lap 8 to lap 10, when the vehicle was continually driven ten laps around the dry circuit course were evaluated according to the following evaluation criteria. An average time for a pneumatic tire of Comparative example 1 was used as a standard time. The obtained results are shown on the "Latter grip performance" rows of Tables 1 to 3. A higher rating indicates superior grip performance during the latter half of continued traveling and superior maintainability of grip performance.

5: The average lap time is at least 0.5 seconds faster than the standard time.

4: The average lap time is from more than 0.2 seconds to less than 0.5 seconds faster than the standard time.

3: The average lap time is less than 0.2 seconds faster than the standard time.

2: The average lap time is from at least 0.2 seconds to less than 0.5 seconds slower than the standard time.

1: The average lap time is more than 0.5 seconds slower than the standard time.

In Tables 1 to 3 below, the following abbreviations are used:
PBW: Parts by Weight;
CE: Comparative Example; and
Ex: Example.

TABLE 1

|  |  | CE 1 | Ex 1 | Ex 2 | Ex 3 | Ex 4 | Ex 5 | Ex 6 | Ex 7 | Ex 8 |
|---|---|---|---|---|---|---|---|---|---|---|
| NR | PBW |  | 20 | 20 | 20 | 20 | 30 | 20 | 20 | 20 |
| SBR 2 | PBW | 137.5 | 110 | 110 |  |  |  |  |  |  |
| SBR 3 | PBW |  |  |  | 120 | 120 | 105 | 120 | 120 | 120 |
| Carbon black 1 | PBW | 100 |  |  |  |  |  |  |  |  |
| Carbon black 2 | PBW |  | 100 | 100 | 100 | 100 | 100 | 100 | 100 | 100 |
| Tackifying resin 1 | PBW | 30 |  |  |  |  |  |  |  |  |
| Tackifying resin 2 | PBW |  | 30 |  |  |  |  |  |  |  |
| Tackifying resin 3 | PBW |  |  | 30 | 30 | 30 | 30 |  | 20 | 40 |
| Tackifying resin 4 | PBW |  |  |  |  |  |  | 30 |  |  |
| Oil | PBW | 32.5 | 40 | 40 | 30 | 30 | 45 | 30 | 40 | 20 |
| Antiaging agent | PBW | 2 | 2 | 2 | 2 | 2 | 2 | 2 | 2 | 2 |
| Zinc oxide | PBW | 3 | 3 | 3 | 3 | 3 | 3 | 3 | 3 | 3 |
| Stearic acid | PBW | 2 | 2 | 2 | 2 | 2 | 2 | 2 | 2 | 2 |
| Vulcanization accelerator 1 (T) | PBW |  | 1.75 | 1.75 | 1.75 |  |  |  |  |  |
| Vulcanization accelerator 2 (T) | PBW |  |  |  |  | 2 | 2 | 2 | 2 | 2 |
| Vulcanization accelerator 3 (A) | PBW | 2 | 2 | 2 | 2 | 2 | 2 | 2 | 2 | 2 |
| Sulfur (S) | PBW | 1.43 | 1.43 | 1.43 | 1.43 | 1.43 | 1.43 | 1.43 | 1.43 | 1.43 |
| Weight ratio (A + T)/S | — | 1.4 | 2.6 | 2.6 | 2.6 | 2.8 | 2.8 | 2.8 | 2.8 | 2.8 |
| Initial grip performance | Rating | 3 | 5 | 4 | 5 | 5 | 5 | 4 | 5 | 4 |
| Latter grip performance | Rating | 3 | 4 | 5 | 5 | 5 | 4 | 5 | 4 | 5 |
| Blow-out resistance | Index | 100 | 123 | 125 | 118 | 138 | 143 | 118 | 142 | 135 |
| Wear resistance | Index | 100 | 111 | 113 | 108 | 107 | 113 | 106 | 110 | 105 |

TABLE 2

|  |  | Ex 9 | Ex 10 | Ex 11 | Ex 12 | Ex 13 | Ex 14 | CE 2 | CE 3 | CE 4 |
|---|---|---|---|---|---|---|---|---|---|---|
| NR | PBW | 20 | 20 | 20 | 20 | 20 | 20 | 0 | 40 | 20 |
| SBR 1 | PBW |  |  |  |  |  |  |  |  | 120 |
| SBR 3 | PBW | 120 | 120 | 120 | 120 | 120 | 120 | 137.5 | 90 |  |
| Carbon black 1 | PBW | 20 |  |  |  |  |  |  |  |  |
| Carbon black 2 | PBW | 80 | 80 | 80 | 100 | 100 | 100 | 100 | 100 | 100 |
| Carbon black 3 | PBW |  | 20 |  |  |  |  |  |  |  |
| Silica | PBW |  |  | 20 |  |  |  |  |  |  |
| Tackifying resin 3 | PBW | 30 | 30 | 30 | 30 | 30 | 30 | 30 | 30 | 30 |
| Oil | PBW | 30 | 30 | 30 | 30 | 30 | 30 | 32.5 | 60 | 30 |
| Antiaging agent | PBW | 2 | 2 | 2 | 2 | 2 | 2 | 2 | 2 | 2 |
| Zinc oxide | PBW | 3 | 3 | 3 | 3 | 3 | 3 | 3 | 3 | 3 |
| Stearic acid | PBW | 2 | 2 | 2 | 2 | 2 | 2 | 2 | 2 | 2 |
| Vulcanization accelerator 2 (T) | PBW | 2 | 2 | 2 | 1.7 | 3 | 2.5 | 2 | 2 | 2 |
| Vulcanization accelerator 3 (A) | PBW | 2 | 2 | 2 | 1.7 | 2 | 2.5 | 2 | 2 | 2 |
| Sulfur (S) | PBW | 1.43 | 1.43 | 1.43 | 1.62 | 1.52 | 1.33 | 1.43 | 1.43 | 1.43 |
| Weight ratio (A + T)/S | — | 2.8 | 2.8 | 2.8 | 2.1 | 3.3 | 3.8 | 2.8 | 2.8 | 2.8 |
| Initial grip performance | Rating | 5 | 4 | 5 | 5 | 4 | 4 | 2 | 4 | 3 |
| Latter grip performance | Rating | 4 | 5 | 4 | 4 | 4 | 5 | 4 | 2 | 1 |
| Blow-out resistance | Index | 150 | 110 | 110 | 125 | 175 | 115 | 90 | 140 | 145 |
| Wear resistance | Index | 115 | 102 | 100 | 105 | 120 | 104 | 85 | 119 | 127 |

TABLE 3

|  |  | CE 5 | CE 6 | CE 7 | CE 8 | CE 9 | CE 10 | CE 11 | CE 12 | CE 13 |
|---|---|---|---|---|---|---|---|---|---|---|
| NR | PBW | 20 | 20 | 20 | 20 | 20 | 20 | 20 | 20 | 20 |
| SBR 3 | PBW | 120 | 120 | 120 | 120 | 120 | 120 | 120 | 120 | 120 |
| Carbon black 1 | PBW |  |  |  |  |  | 100 |  |  |  |
| Carbon black 2 | PBW | 100 | 100 | 100 | 100 | 100 |  | 60 | 150 |  |
| Carbon black 3 | PBW |  |  |  |  |  |  |  |  | 100 |
| Tackifying resin 1 | PBW | 30 |  |  |  |  |  |  |  |  |
| Tackifying resin 3 | PBW |  |  | 60 | 30 | 30 | 30 | 30 | 30 | 30 |
| Tackifying resin 5 | PBW |  | 30 |  |  |  |  |  |  |  |
| Oil | PBW | 30 | 30 | 0 | 30 | 30 | 30 | 0 | 80 | 30 |
| Antiaging agent | PBW | 2 | 2 | 2 | 2 | 2 | 2 | 2 | 2 | 2 |
| Zinc oxide | PBW | 3 | 3 | 3 | 3 | 3 | 3 | 3 | 3 | 3 |
| Stearic acid | PBW | 2 | 2 | 2 | 2 | 2 | 2 | 2 | 2 | 2 |
| Vulcanization accelerator 1 (T) | PBW | 1.75 | 1.75 | 1.75 | 0 | 5.6 | 1.75 | 1.75 | 1.75 | 1.75 |
| Vulcanization accelerator 3 (A) | PBW | 2 | 2 | 2 | 2 | 2 | 2 | 2 | 2 | 2 |
| Sulfur (S) | PBW | 1.43 | 1.43 | 1.43 | 1.43 | 1.43 | 1.43 | 1.43 | 1.43 | 1.43 |
| Weight ratio (A + T)/S | — | 2.6 | 2.6 | 2.6 | 1.4 | 5.3 | 2.6 | 2.6 | 2.6 | 2.6 |
| Initial grip performance | Rating | 3 | 2 | 1 | 2 | 2 | 1 | 1 | 2 | 1 |
| Latter grip performance | Rating | 2 | 3 | 3 | 1 | 3 | 1 | 1 | 1 | 3 |
| Blow-out resistance | Index | 125 | 117 | 114 | 80 | 123 | 177 | 250 | 65 | 72 |
| Wear resistance | Index | 113 | 103 | 102 | 85 | 98 | 162 | 180 | 60 | 66 |

The types of raw materials used in Tables 1 to 3 are shown below.

NR (natural rubber): STR-20

SBR 1 (styrene butadiene rubber): Glass transition temperature=−46° C. (TUFDENE™ 2330, manufactured by Asahi Kasei Chemicals Corporation; oil extended product having 37.5 parts by weight of aroma oil added per 100 parts by weight of rubber)

SBR 2 (styrene butadiene rubber): Glass transition temperature=−31° C. (TUFDENE™ 3335, manufactured by Asahi Kasei Chemicals Corporation; oil extended product having 37.5 parts by weight of aroma oil added per 100 parts by weight of rubber)

SBR 3 (styrene butadiene rubber): Glass transition temperature=−18° C. (TUFDENE™ 4350, manufactured by Asahi Kasei Chemicals Corporation; oil extended product having 50 parts by weight of aroma oil added per 100 parts by weight of rubber)

Carbon black 1: Diamond Black A (manufactured by Mitsubishi Chemical Corporation); Nitrogen specific surface area $(N_2SA)$=142 $m^2/g$ Carbon black 2: CD2019 (manufactured by Columbian Chemicals Company); Nitrogen specific surface area ($N_2SA$)= 340 $m^2$/g Carbon black 3: BLACK PEARLS 1300 (manufactured by Cabot Corporation); Nitrogen specific surface area ($N_2SA$)= 560 $m^2$/g Tackifying resin 1 (aromatic modified terpene resin): YS Resin TO85 (manufactured by Yasuhara Chemical Co., Ltd.); Softening point=85±5° C.

Tackifying resin 2 (aromatic modified terpene resin): YS Resin TO105 (manufactured by Yasuhara Chemical Co., Ltd.); Softening point=105±5° C.

Tackifying resin 3 (aromatic modified terpene resin): YS Resin TO125 (manufactured by Yasuhara Chemical Co., Ltd.); Softening point=125±5° C.

Tackifying resin 4 (terpene phenol resin): YS Polyster T145 (manufactured by Yasuhara Chemical Co., Ltd.); Softening point=145±5° C.

Tackifying resin 5 (terpene phenol resin): YS Polyster T160 (manufactured by Yasuhara Chemical Co., Ltd.); Softening point=160±5° C.

Oil: A/O Mix (manufactured by Sankyo Yuka Kogyo K.K.)

Antiaging agent: Santoflex 6PPD (manufactured by Flexsys)

Zinc oxide: Zinc Oxide #3 (manufactured by Seido Chemical Industry Co., Ltd.)

Stearic acid: Stearic Acid YR (manufactured by NOF Corp.)

Vulcanization accelerator 1 (thiuram vulcanization accelerator; tetrakis(2-ethylhexyl)thiuram disulfide): NOCCELER TOT-N (manufactured by Ouchi Shinko Chemical Industrial Co., Ltd.); composition: 70 weight % thiuram vulcanization accelerator, 30 weight % silica. The compounded amounts of the thiuram vulcanization accelerator in Tables 1 to 3 are indicated in net-weights.

Vulcanization accelerator 2 (thiuram vulcanization accelerator; tetrabenzylthiuram disulfide): Perkacit TBzTD (manufactured by Flexsys)

Vulcanization accelerator 3 (sulfenamide vulcanization accelerator; N-cyclohexyl-2-benzothizole-2-sulfenamide): NOCCELER CZ (manufactured by Ouchi Shinko Chemical Industrial Co., Ltd.)

Sulfur: "Golden Flower" Oil Treated Sulfur Powder (manufactured by Tsurumi Chemical); compound product having 5 parts by weight of oil per 100 parts by weight of sulfur. The compounded amounts of the sulfur in Tables 1 to 3 are indicated in net-weights.

It is clear from Tables 1 to 3 that unless the natural rubber was compounded, initial grip performance, blow-out resistance, and wear resistance were inferior (see Comparative example 2). If the compounded amount of the natural rubber exceeded 30 weight %, latter grip performance was inferior (see Comparative example 3). If the glass transition temperature of the SBR was lower than −35° C., latter grip performance was inferior (see Comparative example 4). If the softening point of the tackifying resin was lower than 100° C., latter grip performance was inferior (see Comparative example 5). On the other hand, if the softening point of the tackifying resin exceeded 150° C., initial grip performance was inferior (see Comparative example 6). Moreover, if the compounded amount of the tackifying resin exceeded 50 parts by weight, initial grip performance was inferior (see Comparative example 7).

If the thiuram vulcanization accelerator was not compounded and the weight ratio (A+T)/S when A is the compounded amount of the sulfenamide vulcanization accelerator, T is the compounded amount of the thiuram vulcanization accelerator, and S is the compounded amount of the sulfur, was less than 2, initial grip performance, latter grip performance, blow-out resistance, and wear resistance were inferior (see Comparative example 8). If the weight ratio (A+T)/S exceeded 4, initial grip performance and wear resistance were inferior (see Comparative example 9).

If the $N_2SA$ of the carbon black was less than 250 $m^2$/g, initial grip performance and latter grip performance were inferior (see Comparative example 10). If the $N_2SA$ of the carbon black exceeded 400 $m^2$/g, initial grip performance, blow-out resistance, and wear resistance were inferior (see Comparative example 13). If the compounded amount of the carbon black was less than 70 parts by weight, initial grip performance and latter grip performance were inferior (see Comparative example 11). If the compounded amount of the carbon black exceeded 130 parts by weight, it became necessary to increase the amount of oil for mixing. This led to initial grip performance, latter grip performance, blow-out resistance, and wear resistance all being inferior (see Comparative example 12).

What is claimed is:

1. A rubber composition for use as a tire tread comprising:
    a tackifying resin having a softening point of from 100° C. to 150° C. in an amount of from 10 to 50 parts by weight, the tackifying resin including at least one of a terpene phenol resin, a terpene styrene resin, and a polymerized rosin resin;
    a carbon black having a nitrogen specific surface area of from 250 to 400 $m^2$/g in an amount of from 70 to 130 parts by weight;
    sulfur (S) in an amount of from 1 to 3 parts by weight;
    a sulfenamide vulcanization accelerator (A) in an amount of from 0.5 to 4.0 parts by weight of;
    a rubber component comprising from 10 to 30 weight % of a natural rubber and from 75 to 85 weight % of a styrene butadiene rubber having a glass transition temperature of from −35° C. to 0° C.;
    a thiuram vulcanization accelerator (T) in an amount of from 1.5 to 5.0 parts by weight;
    other fillers, a sum of which, when combined with the carbon black, is from 80 to 130 parts by weight;
    per 100 parts by weight of the rubber component;
    wherein, when compounded, (A+T)/S is a weight ratio of from $2 \leqq (A+T)/S < 4$.

2. The tire tread-use rubber composition according to claim 1, wherein the styrene butadiene rubber has a glass transition temperature of from −25° C. to −10° C.

3. The tire tread-use rubber composition according to claim 1, wherein the tackifying resin has a softening point from 110° C. to 140° C.

4. The tire tread-use rubber composition according to claim 1, wherein the tackifying resin has a softening point from 120° C. to 130° C.

5. The tire tread-use rubber composition according to claim 1, wherein the tire tread-use rubber composition comprises from 20 to 40 parts by weight of the tackifying resin.

6. The tire tread-use rubber composition according to claim 1, wherein the tire tread-use rubber composition comprises from 80 to 120 parts by weight of the carbon black.

7. The tire tread-use rubber composition according to claim 1, wherein the nitrogen specific surface area of the carbon black is from 280 to 370 $m^2$/g.

8. The tire tread-use rubber composition according to claim 1, wherein the nitrogen specific surface area of the carbon black is from 300 to 350 $m^2$/g.

9. The tire tread-use rubber composition according to claim 1, further comprising a silica filler.

10. The tire tread-use rubber composition according to claim 1, further comprising a carbon black filler having a nitrogen specific surface area less than 250 m²/g.

11. The tire tread-use rubber composition according to claim 1, further comprising a carbon black filler having a nitrogen specific surface area greater than 400 m²/g.

12. The tire tread-use rubber composition according to claim 1, comprising from 1.5 to 2.5 parts by weight of the sulfur, from 1.5 to 3.5 parts by weight of the sulfenamide vulcanization accelerator, and from 2.0 to 4.5 parts by weight of the thiuram vulcanization accelerator per 100 parts by weight of the rubber component.

13. The tire tread-use rubber composition according to claim 1, wherein the weight ratio (A+T)/S is from 2.3 to 3.7.

14. The tire tread-use rubber composition according to claim 1, wherein the weight ratio (A+T)/S is from 2.5 to 3.5.

15. The tire tread-use rubber composition according to claim 1, wherein the styrene butadiene rubber is an oil extended product.

16. The tire tread-use rubber composition according to claim 1, further comprising a filler having a compounded amount less than a compounded amount of the carbon black having an $N_2SA$ of from 250 to 400 m²/g, wherein a total of the carbon black having an $N_2SA$ of from 250 to 400 m²/g and the filler is from 80 to 130 parts by weight per 100 parts by weight of the rubber component.

17. The tire tread-use rubber composition according to claim 16, wherein the total of the carbon black having an $N_2SA$ of from 250 to 400 m²/g and the filler is from 90 to 120 parts by weight per 100 parts by weight of the rubber component.

18. A pneumatic tire comprising the tire tread-use rubber composition according to claim 1.

* * * * *